United States Patent
Corley et al.

(10) Patent No.: US 9,058,645 B1
(45) Date of Patent: Jun. 16, 2015

(54) WATERMARKING MEDIA ASSETS AT THE NETWORK EDGE

(75) Inventors: Jonathan B. Corley, Seattle, WA (US); Tal Saraf, Seattle, WA (US); Bradley E. Marshall, Bainbridge Island, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 76 days.

(21) Appl. No.: 13/465,997

(22) Filed: May 7, 2012

(51) Int. Cl.
G06K 9/00 (2006.01)
G06T 7/00 (2006.01)
G06T 1/00 (2006.01)

(52) U.S. Cl.
CPC ............. *G06T 7/0012* (2013.01); *G06T 1/0021* (2013.01)

(58) Field of Classification Search
None
See application file for complete search history.

(56) References Cited

U.S. PATENT DOCUMENTS

| | | | |
|---|---|---|---|
| 5,541,852 A | 7/1996 | Eyuboglu et al. | |
| 6,732,332 B1 | 5/2004 | Borysewcz et al. | |
| 6,970,602 B1 | 11/2005 | Smith et al. | |
| 7,761,900 B2 | 7/2010 | Crayford | |
| 8,634,705 B2 | 1/2014 | Yogeshwar et al. | |
| 2002/0150247 A1* | 10/2002 | Linnartz et al. | 380/205 |
| 2002/0170035 A1 | 11/2002 | Casati et al. | |
| 2006/0168630 A1 | 7/2006 | Davies | |
| 2007/0002946 A1 | 1/2007 | Bouton et al. | |
| 2007/0157260 A1 | 7/2007 | Walker | |
| 2007/0162945 A1 | 7/2007 | Mills | |
| 2007/0174338 A1 | 7/2007 | Liggett | |
| 2008/0034393 A1 | 2/2008 | Crayford | |
| 2008/0146160 A1 | 6/2008 | Jiang et al. | |
| 2008/0205510 A1 | 8/2008 | Komi et al. | |
| 2008/0301588 A1 | 12/2008 | Kumar et al. | |
| 2009/0083279 A1 | 3/2009 | Hasek | |
| 2009/0254672 A1 | 10/2009 | Zhang | |
| 2009/0276266 A1 | 11/2009 | Nishiyama | |
| 2010/0017516 A1 | 1/2010 | Sparrell et al. | |
| 2010/0054148 A1 | 3/2010 | Murakami et al. | |
| 2010/0054327 A1 | 3/2010 | Capless | |
| 2010/0076805 A1 | 3/2010 | Batsakis et al. | |
| 2010/0088505 A1* | 4/2010 | Coppola et al. | 713/153 |
| 2010/0199299 A1 | 8/2010 | Chang et al. | |

(Continued)

OTHER PUBLICATIONS

Non-Final Office Action issued in related U.S. Appl. No. 13/466,002 dated Jan. 3, 2013 (11 pages).

(Continued)

*Primary Examiner* — Atiba O Fitzpatrick
(74) *Attorney, Agent, or Firm* — Novak Druce Connolly Bove + Quigg LLP (57) ABSTRACT

Watermarking techniques are described which can be performed at network edge locations such as a Content Delivery Network (CDN) point-of-presence (POP). An edge server can identify users by request and apply a watermark based on the user to media content stored locally. Performance is improved by moving the watermarking from a central location closer to the user in terms of network proximity. An edge server can receive instructions on what type of watermark to assign and how to assign it. The edge server can use requester's identity to create and apply watermarks at the time of transferring media content to the requester. Individualized watermarking is applied to the bits transmitted to the device, the watermark indicating the specific user downloading the stream, time of transmission, etc. Watermarking can be applied throughout all of the frames of the media content rather than merely attaching it at a specific place.

23 Claims, 6 Drawing Sheets

(56) References Cited

U.S. PATENT DOCUMENTS

| | | |
|---|---|---|
| 2010/0205616 A1 | 8/2010 | Lai et al. |
| 2010/0250710 A1 | 9/2010 | Cadwell et al. |
| 2010/0281042 A1 | 11/2010 | Windes et al. |
| 2010/0309794 A1 | 12/2010 | Keynan et al. |
| 2010/0332262 A1 | 12/2010 | Horvitz et al. |
| 2011/0019870 A1* | 1/2011 | Ballocca et al. ............... 382/100 |
| 2011/0082982 A1 | 4/2011 | Harvell et al. |
| 2011/0088076 A1 | 4/2011 | Li et al. |
| 2011/0153628 A1 | 6/2011 | Basu et al. |
| 2011/0197221 A1 | 8/2011 | Rouse et al. |
| 2011/0209162 A1 | 8/2011 | Machiraju et al. |
| 2011/0313982 A1 | 12/2011 | Kranendonk et al. |
| 2011/0314093 A1 | 12/2011 | Sheu et al. |
| 2012/0072542 A1 | 3/2012 | McGowan |
| 2012/0089687 A1 | 4/2012 | Katz |
| 2012/0102154 A1 | 4/2012 | Huang et al. |
| 2012/0158645 A1 | 6/2012 | Shafiee et al. |
| 2012/0159494 A1 | 6/2012 | Shafiee et al. |
| 2012/0159503 A1 | 6/2012 | Shafiee et al. |
| 2012/0192239 A1 | 7/2012 | Harwell et al. |
| 2012/0209942 A1 | 8/2012 | Zehavi et al. |
| 2012/0236201 A1 | 9/2012 | Larsen et al. |
| 2012/0254456 A1 | 10/2012 | Visharam et al. |
| 2012/0265847 A1 | 10/2012 | Swenson et al. |
| 2012/0278441 A1 | 11/2012 | Li et al. |
| 2013/0019311 A1 | 1/2013 | Swildens |
| 2013/0054827 A1 | 2/2013 | Feher et al. |

OTHER PUBLICATIONS

Final Office Action issued in related U.S. Appl. No. 13/466,002 dated Jul. 19, 2013 (12 pages).
Non-Final Office Action issued in U.S. Appl. No. 13/465,931 dated Dec. 4, 2014, 15 pages.
Non-Final Office Action issued in U.S. Appl. No. 13/465,944 dated Sep. 24, 2014, 23 pages.
Final Office Action issued in U.S. Appl. No. 13/465,975 dated Sep. 11, 2014, 48 pages.
Non-Final Office Action issued in U.S. Appl. No. 13/465,975 dated Feb. 4, 2014, 32 pages.
Final Office Action issued in U.S. Appl. No. 13/465,978 dated Jul. 3, 2014, 26 pages.
Non-Final Office Action issued in U.S. Appl. No. 13/465,978 dated Feb. 4, 2014, 23 pages.
Non-Final Office Action issued in U.S. Appl. No. 13/465,987 dated Apr. 2, 2013, 9 pages.
Final Office Action issued in U.S. Appl. No. 13/465,987 dated Oct. 24, 2013, 10 pages.
Non-Final Office Action issued in U.S. Appl. No. 13/465,992 dated Jul. 29, 2014, 32 pages.
Non-Final Office Action issued in U.S. Appl. No. 13/466,002 dated Sep. 23, 2014, 12 pages.
Newton, "API", Newton's Telecom Dictionary, 18th Ed., Feb. 2002, pp. 71.

* cited by examiner

WATERMARKING MEDIA ASSETS AT THE NETWORK EDGE

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Transcoding is the decoding and recoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported.

Watermarking is the process of embedding identity information into a digital audio or video signal. This embedded information may subsequently be used to verify the authenticity of the signal or the identity of its owners. A signal can carry one or multiple watermarks embedded therein.

A content delivery network (CDN) is an interconnected network of computer nodes that contain copies of various types of data. CDNs are used to deliver content to end users in a more efficient manner by bringing the data in closer proximity to the end user. Using a CDN can improve access to the data cached at the nodes by increasing access bandwidth/redundancy and reducing access latency. CDNs are often used to provide access to media content.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for watermarking media. In particular, the various embodiments provide approaches for watermarking digital media content at the network edge (e.g. CDN point-of-presence) per individual user request.

In accordance with various embodiments, a set of watermarking techniques are described that can be performed by a component located at the network edge, such as by a server residing at a Content Delivery Network (CDN) point-of-presence (POP). A watermarking system or service located at the network edge can identify users based on the information contained in their requests and apply a watermark to a copy of media content, wherein the watermark is specific to the information about the user or the user's request. This can improve performance by moving the watermarking from a conventional central location to, for example, a network edge server.

In accordance with an embodiment, the watermarking of media content can be performed upon transcoding the media content at the network edge. The edge server can receive instructions on what type of watermark to assign and how to assign it. The edge server can then use the requester's identity to generate a watermark which will be applied to the media content transferred to that requester. In this manner, individualized watermarking can be applied to the bits transmitted to the device (e.g. watermark can indicate the specific user that downloaded the specific stream, time of transmission, and the like). In addition, because the watermarking is performed at the time of transcoding the content, the watermarking can be applied throughout all of the frames of the media file instead of only attaching it at a specific place (e.g. front of the file, end of the file) as in conventional implementations.

In various embodiments, the system for watermarking and transcoding media can be provided by a service provider that provides a set of resources in a multi-tenant computing environment (e.g. cloud computing environment). For example, the service provider may provide the content delivery network (CDN) for delivering media content to various end users. The CDN can include a number of points-of-presence (POPs) distributed in a variety of geographic locations. In at least one embodiment, the watermarking of media content can be performed by a server (or other component) residing in one or more of the POPs of the service provider.

Figure 1:
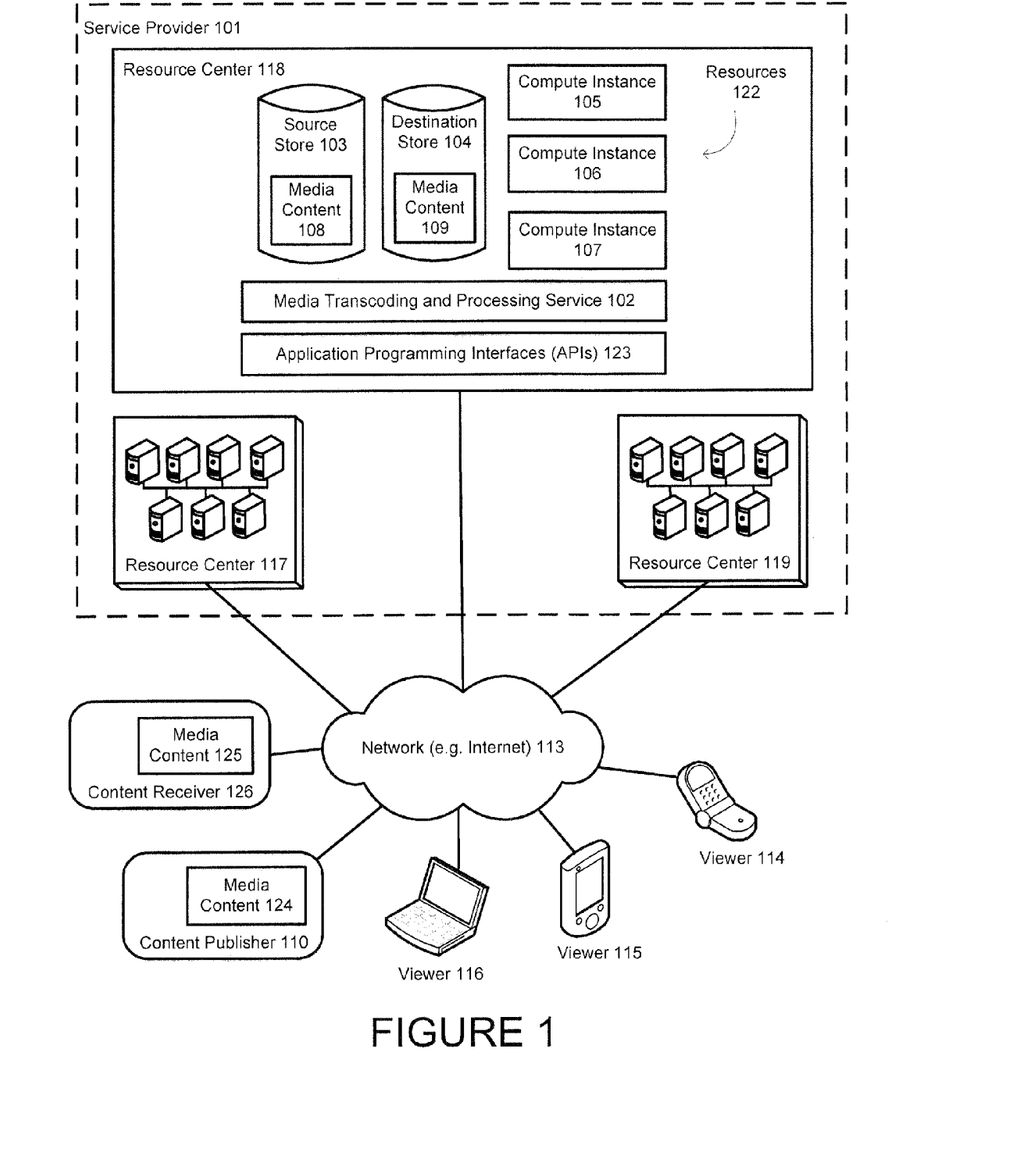
FIG. 1 is a general illustration of an environment in which watermarking and transcoding can be implemented, in accordance with various embodiments.

FIG. 1 is a general illustration of an environment 100 in which watermarking and transcoding can be implemented, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 2:
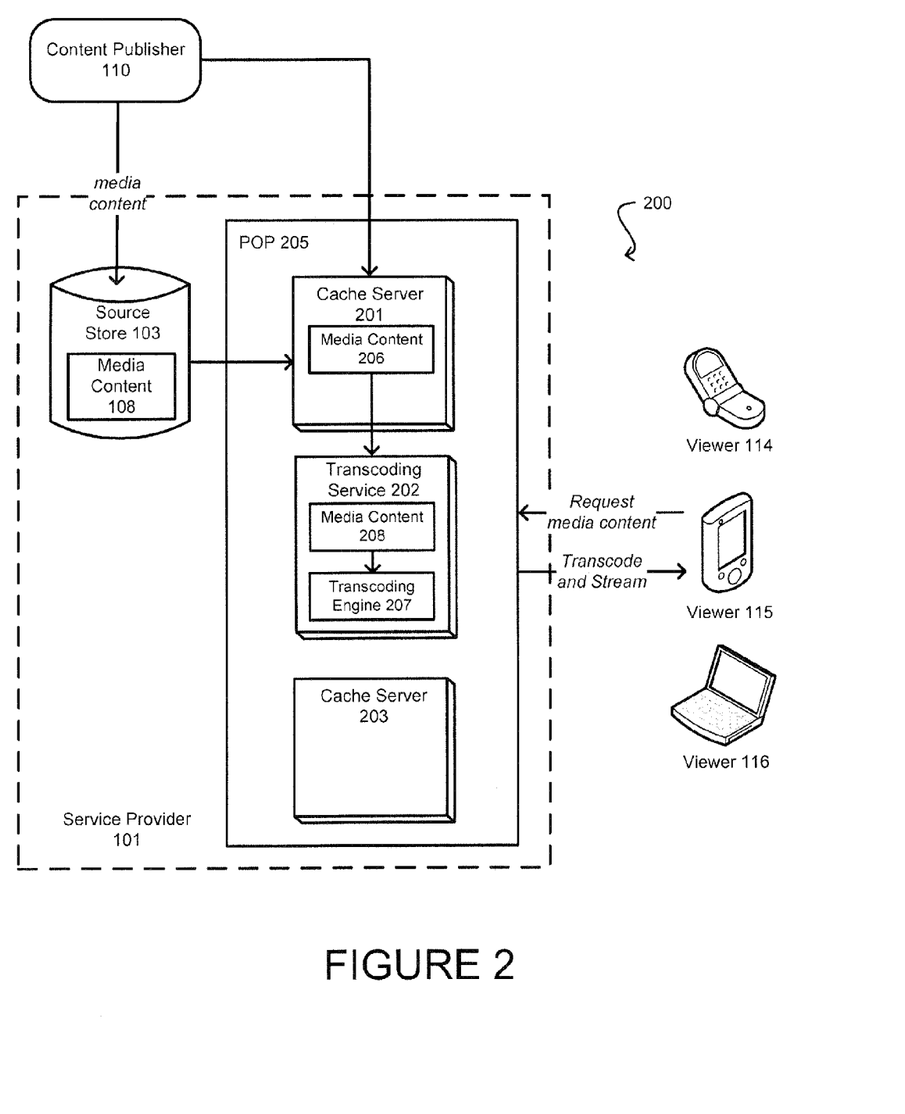
FIG. 2 illustrates an example of a network edge environment where media content can be dynamically transcoded based at least in part upon on requesting device type, in accordance with various embodiments.

FIG. 2 is an example of a network edge environment 200 where media content can be dynamically transcoded based at least in part upon on requesting device type, in accordance with various embodiments. It should be understood that reference numbers for like components may be carried over between figures for purposes of explanation, but this should not be interpreted as limiting the scope of the various embodiments.

As previously described, a content publisher 110 can provide the media content 108 to the source store 103 or some other storage location provided by the service provider 101. The service provider can then transfer the media content to a cache server 201 (or another server) residing at the content delivery network (CDN) point of presence (POP) 205 in order to make access to it more efficient for users proximate to that POP. In an alternative embodiment, the content publisher 110 may provide the media content 108 directly to the POP 205 from a location on the content publisher 110. As previously mentioned, the CDN of the service provider may include a plurality of POPs (such as POP 205) which may be geographically distributed to various locations that are proximate to the end users and devices. Several POPs can use the same internet protocol (IP) address and the routing scheme can be utilized that to find a POP that is the closest to an end user in terms of network hops required to reach it. It should be noted that while the source store 103 is shown as being located outside of POP 205 in FIG. 2, this is not intended to be a limitation to the various embodiments described herein. In some embodiments, the source store may be located at the same POP 205 and therefore may not need to be transferred. In other embodiments, the source store 103 may be located at another POP (or other resource center) and the transfer of the media content from the source store 103 to the POP 205 may occur in response to receiving the request for the media content at POP 205. Alternatively, the transfer of the media content from the source store 103 to POP 205 may be performed automatically upon placement of the media content into the source store.

In accordance with the illustrated embodiment, POP 205 can include a number of cache servers (201, 203) capable of storing a copy of the media content 206 locally to be made available to the various requesting devices. In addition, the POP 205 may include a transcoding service 202. When a viewer device (e.g. device 115) requests the media content from the POP 205, the request can be inspected to determine a device type (or application-type, OS-type, browser-type, etc.) associated with the requesting viewer based on information contained in the request. For example, based on the HTTP header information contained in the request, it may be determined that the device 115 requesting the media file is a mobile phone running the Apple® IOS operating system. In accordance with various embodiments, each device type can be associated with a particular type of encoding format that is suitable to display or render the media file on that device. In addition, a profile may be associated with the device type and may contain all of the processing settings and parameters necessary to transcode the media content into the format appropriate for the device.

In accordance with an embodiment, once the type of device requesting the content is identified, the POP 205 can make a determination whether the copy 206 of the media content is in the appropriate format for being displayed on the requesting device 115. If the media content is already in the appropriate format, the cache server 201 can simply provide the cached copy to the requesting device 115. If on the other hand, the media file is not in the correct format to be displayed on the requesting device 115, the cache server 201 can provide the media content to the transcoding service 202 having a transcoding engine 207 to perform dynamic transcoding of the media content 208. In accordance with an embodiment, the transcoding service 202 can utilize a graphics processing unit (GPU) configuration to transcode the media content 208 in an optimal performance manner. For example, the transcoding service 202 can use the compute unified device architecture (CUDA) as the computing engine in the GPU to encode the video content into the appropriate format for the requesting device. It should be noted that as previously mentioned, the term "transcoding" is not necessarily limited to changing the format of the media content, but may also include performing such functions as transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. For example, if a requesting device is not able to handle a certain quality video stream, or a certain data transfer rate, the transcoding service 202 may adjust the quality of the video stream or the data transfer rate to accommodate the device.

In accordance with an embodiment, the transcoding service 202 can transcode the media content 208 on-the-fly into the correct encoding format when responding to the request by transmitting bits of the media content to device 115. For example, the POP 205 can stream the bits that have been encoded into the proper format to the device, while the transcoding engine 207 is transcoding the remaining bits of the media content. In accordance with one embodiment, the POP 119 can utilize an initial burst mode to stream the beginning portion of the media content transcoded at one bit rate and then complete the remaining portion of the media content at a different bit rate. Alternatively, the POP 205 can utilize more compute instances to transcode the first portion of the media content at a faster rate during the burst mode and subsequently reduce the number of compute instances. This can help avoid any latency on the part of the requesting device that may be viewing the media content as it is being transcoded and streamed to it.

In accordance with an embodiment, if the transcoding service 202 detects that the requesting device 115 has ceased downloading the media, the dynamic transcoding can be terminated in order to save the computing resources of the POP 205. For example, if the user stops viewing the video file, the transcoding service can halt the transcoding process and apply the GPU resource to other transcoding jobs that may be needed.

Figure 3:
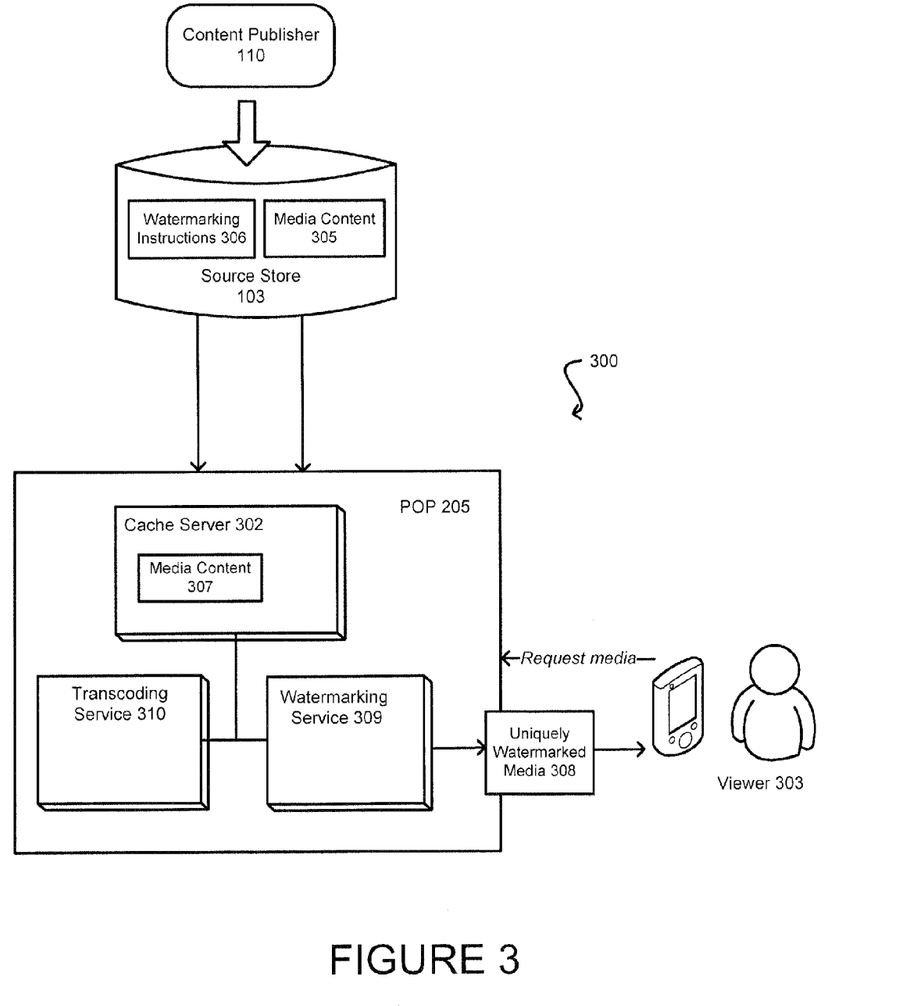
FIG. 3 illustrates an example of a network edge environment where media content can be watermarked, in accordance with various embodiments.

FIG. 3 illustrates an example of a network edge environment 300 where media content can be watermarked, in accordance with various embodiments.

In accordance with various embodiments, a service provider may implement a POP 205 to deliver the media content of the various content publishers to the viewers and end users. As illustrated, the content publisher 110 may begin by providing or uploading the media content 305 to a source store 103 or some other storage location owned by the service provider or the content publisher. The storage location can be located on any data store or server that is made available for use by the content publisher.

In addition to providing the media content 305, the content publisher can also supply a set of watermarking directions 306, specifying how a watermark should be used with distribution of the media content. The watermarking instructions can specify what type of watermark to apply, the content of the watermark, where in the media content to apply the watermark and the like. In accordance with various embodiments, the watermarking instructions can be supplied by the content distributor via a request to/from the service provider, by using an application programming interface (API), submitting an extensible markup language (XML) file, providing an algorithm to generate the watermark, providing a set of watermarks themselves in a file or by some other means. The watermarking instructions may take the form of key value pairs, code, binary executable file or any other way to specify instructions.

Once the media content has been provided to the service provider, copies of the media content 307 may be moved to the POP and optionally cached at a cache server 302 residing at the POP 205. The caching of the media at the POP can be performed automatically upon receiving the upload of the file or alternatively, the copy can be cached when the POP 205 receives a request for the media content and provides the media to the viewer 303. In addition to caching the media content, the watermarking instructions or a portion thereof can also be communicated to the POP 205 from the source store 103 or another storage location.

In accordance with an embodiment, the POP 205 may receive a request for the media file from a viewer 303 or other end user. Based on the information contained in the request, the CDN POP 205 can identify the user that has submitted the request. Based on this information, the watermarking service 309 at the CDN POP can generate the watermark associated with the user based on the watermarking directions 306 received from the content publisher 110. The watermark will serve to uniquely identify the user or the copy of the media provided to the user at some later time for purposes of authenticity, digital rights management (DRM) or the like. Once the watermark is generated, it can be applied to the media content at the time of responding to the request and delivering the content from the CDN POP 205 to a viewer 303.

It should be noted that although the transcoding service and the watermarking service are shown in FIG. 3 to be separate components, this is not a requirement for all embodiments described herein. In various alternative embodiments, the watermarking service can be integrated with the transcoding service, or alternatively, the watermarking service and the transcoding service may be virtual servers residing on the same physical device. In some embodiments, the watermarking server may be a separate server from the caching server and the transcoding server. In certain cases, it may be desirable to implement logic for routing the request for media content to a specific watermarking server. For example, if a particular watermarking server already has the watermarking code primed, or for security reasons, it may be advantageous to use that particular watermarking server to insert the watermark.

In accordance with an embodiment, the watermarking of the media content can be performed as part of the transcoding service 310 at the CDN POP 205. For example, the watermark can be applied at the time that the transcoding service 310 is transcoding the media content for delivery. Because the watermark can be applied as part of transcoding the media file from one encoding to another, individualized watermarking can be added to the bits that are being transmitted to the end user device. For example, a watermark can be added which identifies which specific user downloaded the specific stream. Additionally, individualized DRM can be layered. In accordance with an embodiment, the watermark can be used by the network edge server to select which format to transcode the media content into. For example, rather than selecting the encoding format according to the device requesting the content, the network edge server may instead select a different encoding format based at least in part on the watermark itself.

In accordance with an embodiment, because the watermark is applied while transcoding, it can be applied throughout a media file (e.g. inserted into all frames of a video) rather than merely at the front or end of the file, like in conventional implementations. This allows for more secure watermarking since the watermark becomes part of the actual content and is not easily removable from the media file. For example, if a watermark has been embedded into every single frame of a video, it becomes significantly more difficult to remove the watermark than if the watermark was simply attached to the file in some other way.

In accordance with various embodiments, performing the watermarking of media at the edge, rather than from a central server, enables the content owner to distribute a single copy to all of the POP servers (gaining the cost and speed efficiency in distribution) while still being able to apply individualized watermarks to identify each individual copy that was distributed to the user.

Figure 4:
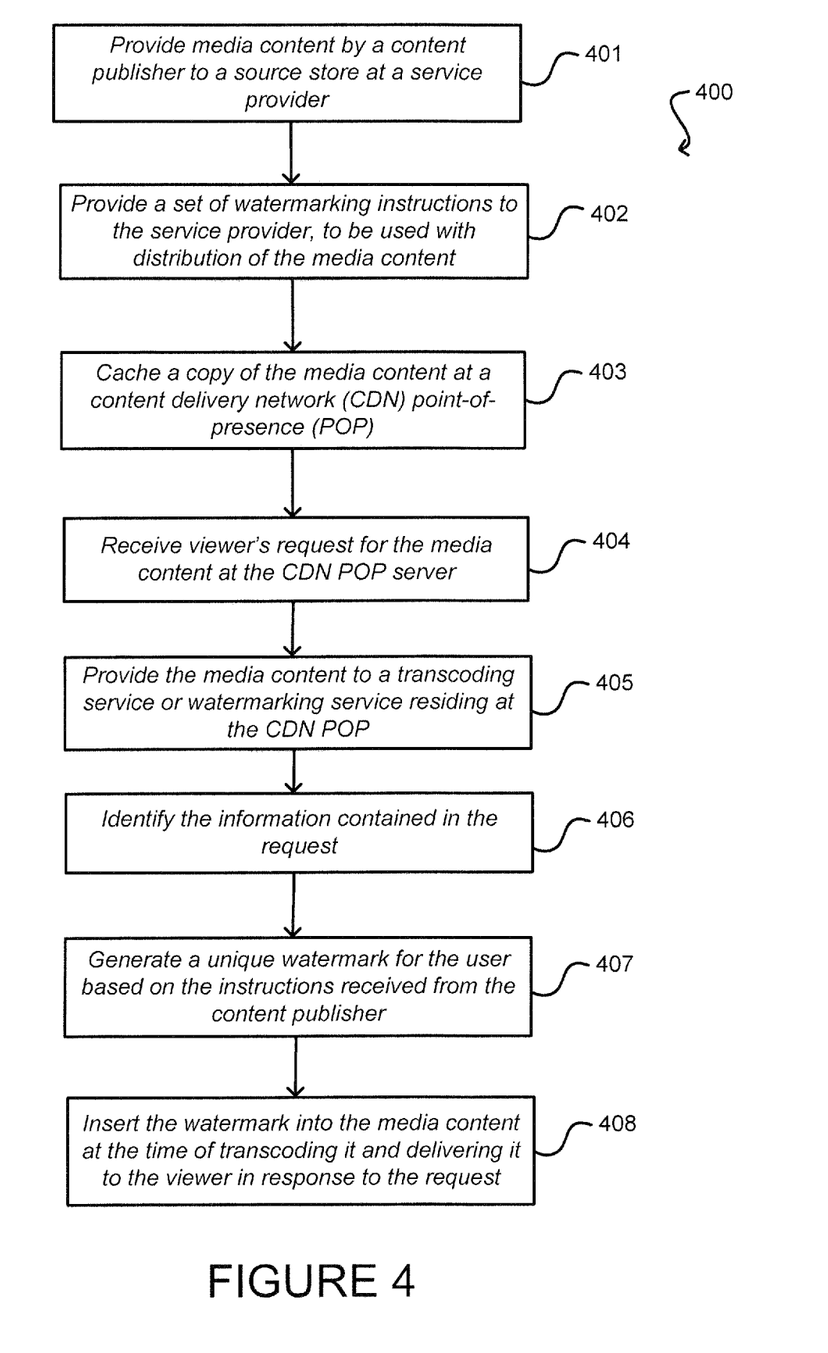
FIG. 4 illustrates an example process for encoding a watermark to digital media at the network edge, in accordance with various embodiments.

FIG. 4 illustrates an example process 400 for encoding a watermark to digital media content at the network edge, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in operation 401, the content publisher can provide media content to a source store provided by a service provider. The media content can be any digital video, audio or graphics content that is desired to be provided to the various end users. In accordance with an embodiment, the content publisher can upload the media content using an API or other interface exposed by the service provider.

In operation 402, the content publisher may further supply a set of watermarking instructions to be used in connection with distribution of the media content. In accordance with an embodiment, the watermarking instructions can specify what type of watermark the content publisher wishes to apply to the media, the location(s) in the media content where the watermark should be inserted and the like. For example, a publisher may desire that the requesting end user's credentials be hashed and used to watermark the digital media content. As another example, the content publisher may wish that a logo indicating the publisher be embedded into the media content.

In operation 403, the media content can be cached at a content delivery network point-of-presence. For example, whenever a viewer first requests to download the media content, the CDN POP can retrieve a copy of the media content and provide it to the user. Thereafter, the CDN POP cache servers can cache the content to optimize performance for future requests. Alternatively, the media content can be automatically sent down to the CDN POP cache servers upon providing the media content to the service provider.

In operation 404, the CDN POP receives a viewer's request for the media content. For example, a user can request to stream a video by using a mobile phone. Since the CDN POP is located in closer proximity to the viewer in terms of network hops, it can provide improved download performance and lower latency for downloading the media content.

In operation 405, the media content can be provided to a transcoding service or a watermarking service. In accordance with an embodiment, the watermarking service can be integrated into the transcoding service such that it is applied at the time of transcoding the media. Alternatively, the watermarking can be performed by a separate dedicated watermarking service located at the CDN POP.

In operation 406, the information contained in the request is analyzed in order to generate the watermark. In accordance with an embodiment, the HTTP header information can be analyzed to identify the user (e.g. viewer) that initiated the request for the media content. Alternatively, some other credential or information associated with the request can be obtained.

In operation 407, the watermarking service at the CDN POP can generate a unique watermark to identify the media content. The watermark can be generated by taking into account the watermarking instructions that were supplied by the content publisher. In accordance with an embodiment, the watermark can be constructed by the transcoding service or by a separate watermarking service, and applied to the media content.

In operation 408, the watermark is embedded into the media content at the time of encoding the content and delivering it to the viewer. For example, when the transcoding service transcodes the media content from one encoding format to a different encoding format, it can insert the watermark (which is unique to the requesting user) into the media content. In accordance with an embodiment, the media content can be watermarked as it is being encoded and streamed to the user. In alternative embodiments, the watermark can be inserted upon performing a variety of other functions to the media content, including but not limited to transmuxing, transrating, segmenting, applying access controls, adding meta data, inserting advertisements, translating into various languages, transcribing, changing bit rates, sequencing, changing or adding audio associated with a video, or modifying, customizing, or other function on the media content as described in this disclosure.

Figure 5:
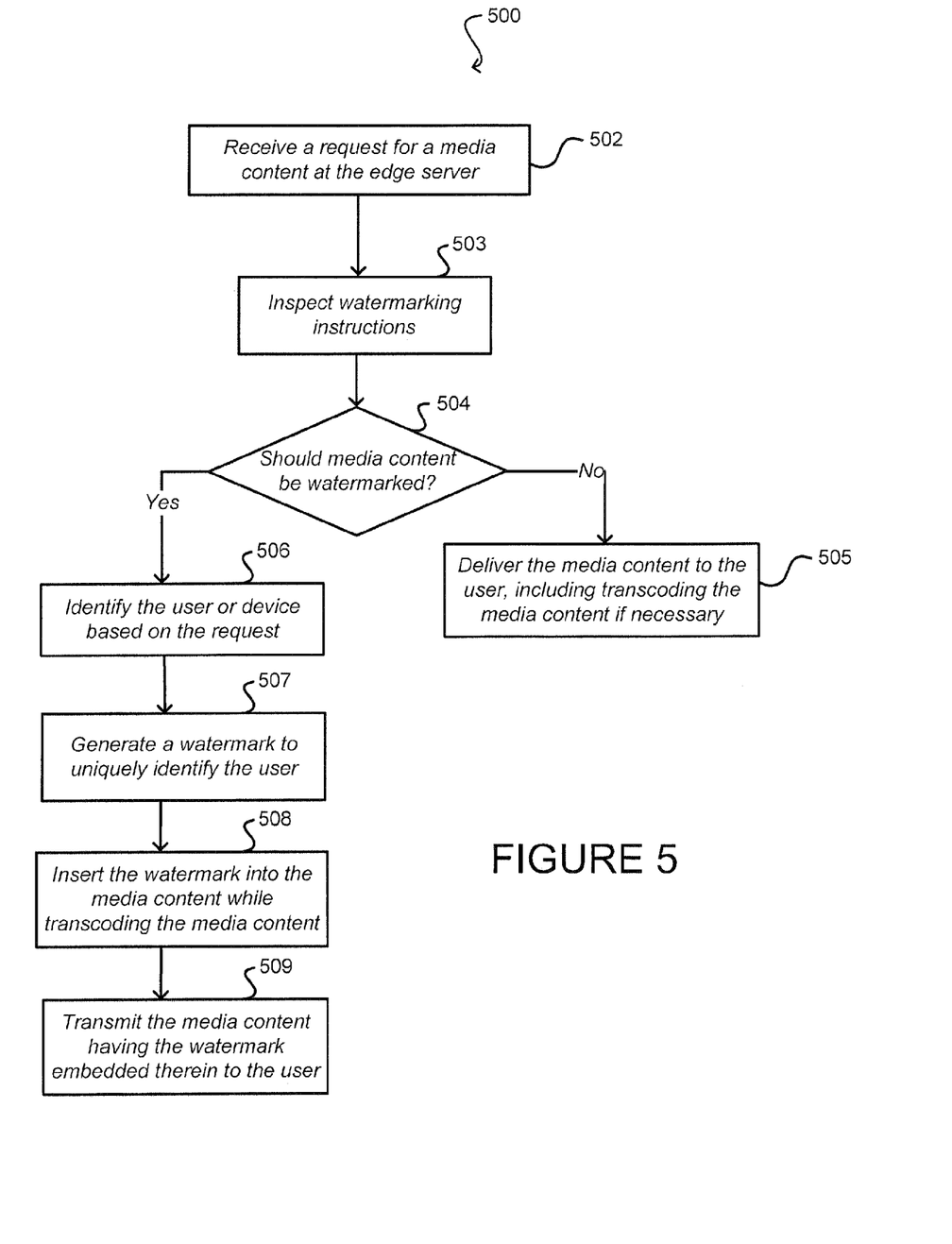
FIG. 5 is an example logical process performed by the network edge server to watermark digital media at the edge, in accordance with various embodiments.

FIG. 5 illustrates an example logical process 500 performed by the network edge server to watermark digital media at the edge, in accordance with various embodiments. As shown in step 502, the network edge server (e.g. CDN POP) receives a request for the media content from an end user (i.e. viewer). In step 503, the watermarking instructions can be inspected and the network edge server can determine whether the media content needs to be watermarked, as shown in step 504. If the media content does not need to be watermarked, the edge server can simply deliver the media content to the user using normal processes, as shown in step 505. For example, if the media content is in the correct format for the requesting device, it can be simply delivered to the end user in response to the request. Alternatively, if the media content is in an inappropriate format, it can first be transcoded into a different encoding format (suitable for displaying at the device) and delivered to the viewer.

If the media content should be watermarked, the edge server can inspect the parameters of the request and identify the user that has initiated the request, as shown in step 506. Once the information in the request has been identified, the edge server can generate a watermark based on that information (step 507). The watermark can then be inserted into the media content, as shown in step 508. For example, the watermark can be attached while the media content is being transcoded into the encoding appropriate for display at the user's device. The media content can then be transmitted to the user with the watermark embedded therein, as shown in step 509. In accordance with an embodiment, the process of encoding the watermark can be performed while simultaneously streaming the bits that have been encoded or watermarked to the user in response to the request.

Figure 6:
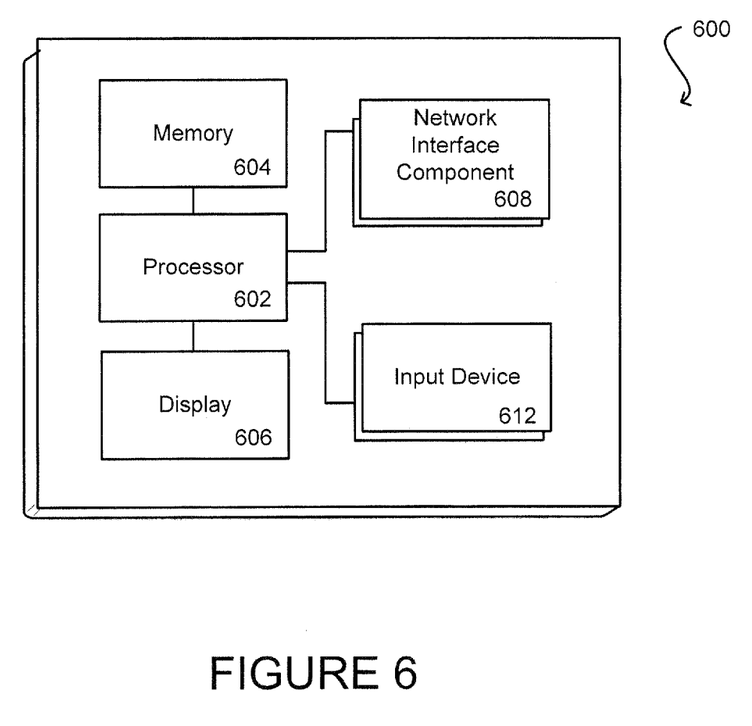
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for watermarking media content at a network edge, said method comprising:
    under the control of one or more computer systems configured with executable instructions,
    receiving media content to a store of a service provider and receiving a set of instructions by the service provider;
    storing a copy of the media content in a server residing at a content delivery network (CDN) point-of-presence (POP);
    receiving a request for the media content at the CDN POP;
    identifying information contained in the request for the media content;
    determining to apply a watermark to the media content;
    generating a version of the watermark that is specific to the request based on the instructions received by the service provider, the watermark being generated based at least in part on the set of instructions received from the service provider, the watermark capable of being used to uniquely identify a copy of the media content issued in response to the request;
    determining a first format for transcoding the media content based at least upon the version of the watermark;
    applying the watermark to the copy of the media content at the CDN POP; and
    transmitting the copy of the media content having the watermark from the CDN POP in response to the request.

2. The method of claim 1, wherein applying the watermark to the copy of the media content further comprises:
    inserting the watermark into the media content by transcoding the media content from a second encoding format into the first encoding format and inserting the watermark into the copy of the media content that has been encoded with the first encoding format.

3. The method of claim 1, wherein the set of instructions received by the service provider further includes:
    information indicating a type of watermark to apply to the media content;
    information indicating contents of the watermark; and
    information indicating at least one location in the media content where the watermark should be applied.

4. The method of claim 1, wherein the set of instructions are provided to the service provider by at least one of:

receiving an invocation of an application programming interface (API);

receiving an extensible markup language (XML) file that contains the set of instructions;

receiving an algorithm that can be implemented to create the watermark; or receiving a file containing the watermark to be inserted into the media content.

5. The method of claim 1, wherein the media content contains a set of video frames and wherein the watermark is applied throughout a plurality of the set of video frames of the media content while the media content is being transcoded.

6. A computer implemented method, comprising:

under the control of one or more computer systems configured with executable instructions, receiving, by a network edge server, a request for media content from a user;

obtaining information associated with the request for the media content;

determining to apply a watermark to the media content;

generating a unique watermark at the network edge server, the unique watermark being specific to the information associated with the request, the watermark capable of uniquely identifying the user requesting the media content, the watermark being generated based at least in part on a set of instructions received from a service provider;

attaching the watermark to the media content by the network edge server;

determining a first format for transcoding the media content based at least upon the version of the watermark; and providing the media content including the attached watermark from the network edge server to the user in response to the request.

7. The method of claim 6, further comprising:

enabling a content publisher to provide the media content to a store by the service provider, the service provider providing the network edge server; and receiving a set of instructions from the content publisher to the service provider, the set of instructions specifying the watermark to be used with distribution of the media content.

8. The method of claim 6, further comprising:

using the watermark attached to the media content to enforce digital rights management (DRM) associated with the media content or to identify a source of a leak of the media content.

9. The method of claim 6, wherein attaching the watermark to the media content further comprises:

inserting the watermark into the media content by transcoding the media content stored at the network edge server from a second format into the first format and inserting the watermark into the media content that has been encoded with the first encoding format.

10. The method of claim 6, wherein attaching the watermark to the media content further comprises:

inserting the watermark into a container that the media content is formatted in.

11. The method of claim 6, wherein attaching the watermark to the media content further comprises:

selecting a watermarking server from a plurality of watermarking servers to perform attaching the watermark to the media content, the watermark server selected according to a set of selection criteria.

12. The method of claim 6, wherein the media content contains a set of video frames and wherein the network edge server applies the watermark throughout a plurality of the set of video frames of the media content.

13. The method of claim 6, further comprising:

receiving a request for the media content to the network edge server from the user;

transferring the media content from a source location to the network edge server;

delivering the media content to the user from the network edge server; and caching the media content at the network edge server to satisfy future requests for the media content.

14. The method of claim 6, wherein the watermark is generated by performing at least one of:

applying a hash function to a set of information contained in the request to create the watermark; or retrieving the watermark from a finite set of watermarks and associating the watermark to the request for the media content.

15. A system, comprising:

a processor; and a memory device including instructions that, when executed by the processor, cause the system to:

receive, by a network edge server, a request for media content from a user;

obtain information associated with the request for the media content;

determine to apply a watermark to the media content;

generate a unique watermark at the network edge server, the unique watermark being specific to the information associated with the request, the watermark capable of uniquely identifying the user requesting the media content, and the watermark being generated based at least in part on a set of instructions received from a service provider;

attach the watermark to the media content by the network edge server;

determine a first format for transcoding the media content based at least upon the version of the watermark; and providing the media content including the attached watermark from the network edge server to the user in response to the request.

16. The system of claim 15, wherein the instructions further cause the system to:

enable a content publisher to provide the media content to a store by a service provider, the service provider providing the network edge server; and receive the set of instructions from the content publisher to the service provider, the set of instructions specifying the watermark to be used with distribution of the media content.

17. The system of claim 15, wherein the instructions further cause the system to:

use the watermark attached to the media content to enforce digital rights management (DRM) associated with the media content or to identify a source of a leak of the media content.

18. The system of claim 15, wherein the watermark to the media content is attached by inserting the watermark into the media content by transcoding the media content stored at the network edge server from a second format into the first format and inserting the watermark into the media content that has been encoded with the first encoding format.

19. The system of claim 15, wherein the watermark to the media content is attached by inserting the watermark into a container that the media content is formatted in.

20. The system of claim 15, wherein the watermark to the media content is attached by selecting a watermarking server from a plurality of watermarking servers to perform attaching the watermark to the media content, the watermark server selected according to a set of selection criteria.

21. The system of claim 15, wherein the media content contains a set of video frames and wherein the network edge server applies the watermark throughout a plurality of the set of video frames of the media content.

22. The system of claim 15, wherein the instructions further cause the system to:
  receive a request for the media content to the network edge server from the user;
  transfer the media content from a source location to the network edge server;
  deliver the media content to the user from the network edge server; and
  cache the media content at the network edge server to satisfy future requests for the media content.

23. The system of claim 15, wherein the watermark is generated by performing at least one of:
  applying a hash function to a set of information contained in the request to create the watermark; or
  retrieving the watermark from a finite set of watermarks and associating the watermark to the request for the media content.

* * * * *